UNITED STATES PATENT OFFICE.

CARL SCHIRMACHER, OF SODEN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

RED AZO DYE AND PROCESS OF MAKING SAME.

SPECIFICATION forming part of Letters Patent No. 724,743, dated April 7, 1903.

Application filed February 4, 1903. Serial No. 141,849. (No specimens.)

*To all whom it may concern:*

Be it known that I, CARL SCHIRMACHER, Ph. D., a citizen of the Empire of Germany, residing at Soden-on-the-Taunus, Germany, have invented certain new and useful Improvements in the Manufacture of a Red Azo Dyestuff, of which the following is specification.

I have found that by combining diazotized para-nitranilinhomosulfonic acid with beta-naphthol a red azo dyestuff may be obtained which is of great value for the manufacture of color-lakes. The hitherto unknown para-nitranilinhomosulfonic acid may be obtained from ortho-chlorobenzylchlorid by first transforming the last-named compound with sulfite into ortho-chlorobenzylsulfonic acid, by then nitrating this acid in concentrated sulfuric acid to mononitrochlorobenzylsulfonic acid, and by finally heating the latter with ammonia to 150° centigrade. The ammoniacal salt of para-nitranilinhomosulfonic acid is obtained as a yellow powder, readily soluble in hot water.

To produce the azo dyestuff, I proceed, for instance, as follows: 24.9 parts, by weight, of nitranilinhomosulfonate of ammonia are dissolved in water, to which are added thirty parts of concentrated hydrochloric acid and diazotized with a solution of seven parts of nitrite. The diazo solution is run into a solution of 14.6 parts of beta-naphthol, ten parts of caustic-soda lye of 40° Baumé specific gravity, and twenty parts of sodium carbonate. After stirring for three hours the dyestuff is filtered. It is a red powder of bronze luster soluble with difficulty in cold water, pretty easily soluble in hot water with a yellow-red color. Concentrated sulfuric acid dissolves it with a blue-red color. The dyestuff is particularly suited for the manufacture of lakes.

Having now described my invention, what I claim is—

1. The herein-described process for the manufacture of a red azo dyestuff which consists, in combining the diazotized para-nitranilinhomosulfonic acid with beta-naphthol, substantially as set forth.

2. As a new product, the azo dyestuff obtained by combining para-nitranilinhomosulfonic acid with beta-naphthol, being in form of its sodium salt a red powder of bronze luster; it is pretty easily soluble in hot water with a yellow-red color, but soluble with difficulty in cold water; concentrated sulfuric acid dissolves the dyestuff with a blue-red color.

In testimony that I claim the foregoing as my invention I have signed my name in presence of two subscribing witnesses.

CARL SCHIRMACHER.

Witnesses:
   ALFRED BRISBOIS,
   JOHANN HARTENSTEIN.